March 15, 1966 F. C. MOCK 3,240,197
ENGINE CONTROL
Filed May 31, 1963 3 Sheets-Sheet 1
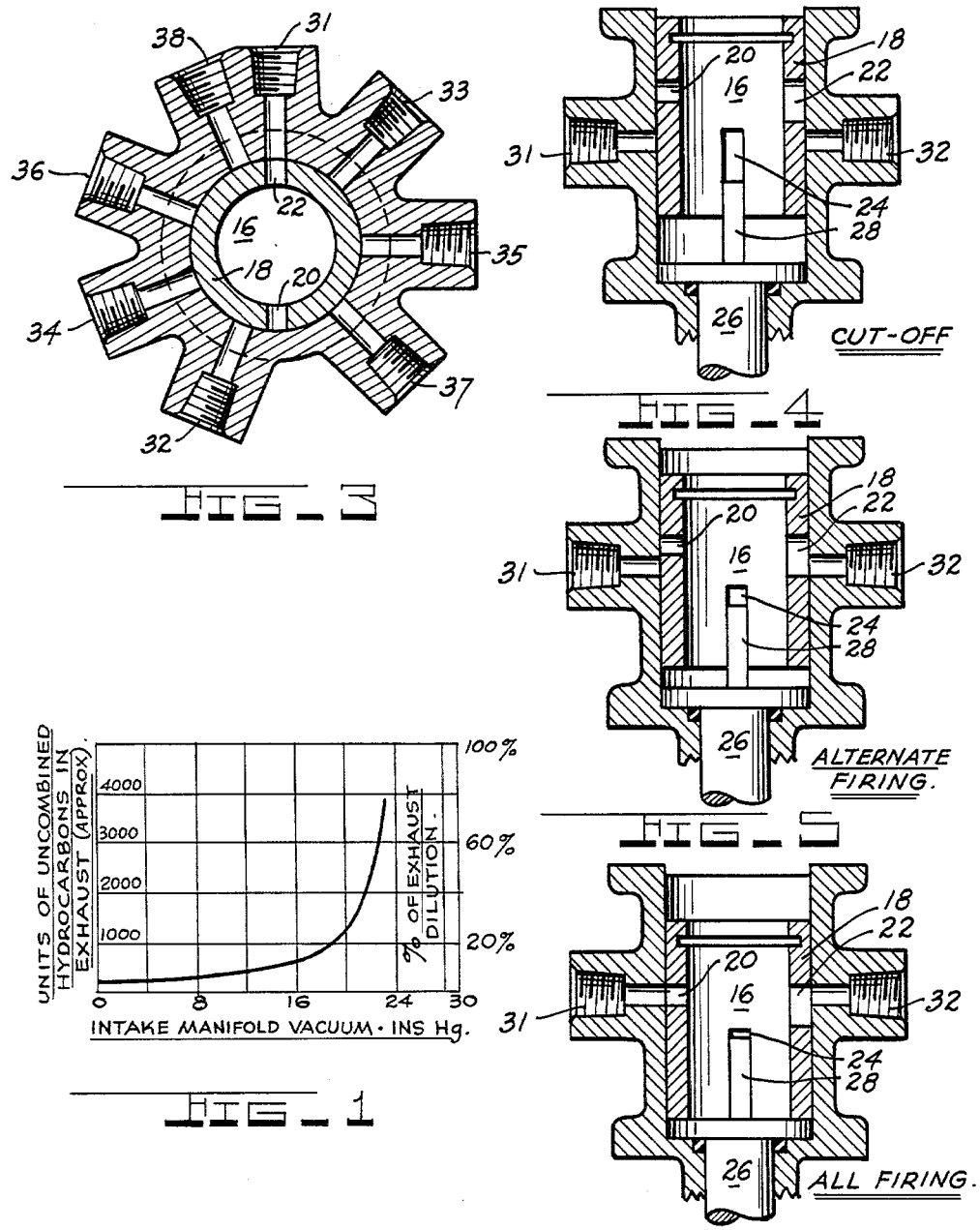
INVENTOR.
FRANK C. MOCK.
BY
William G Thompson
ATTORNEY.

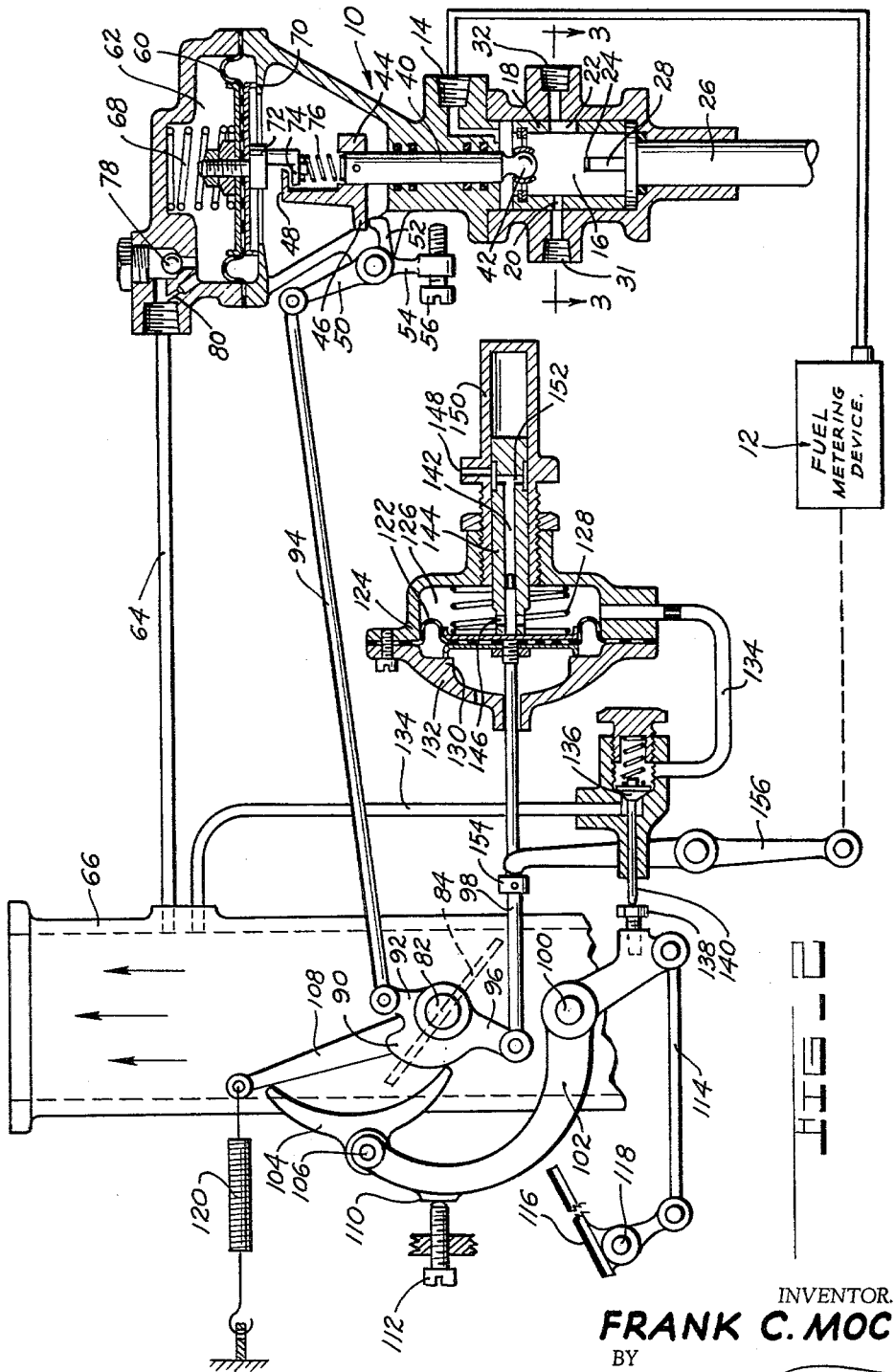

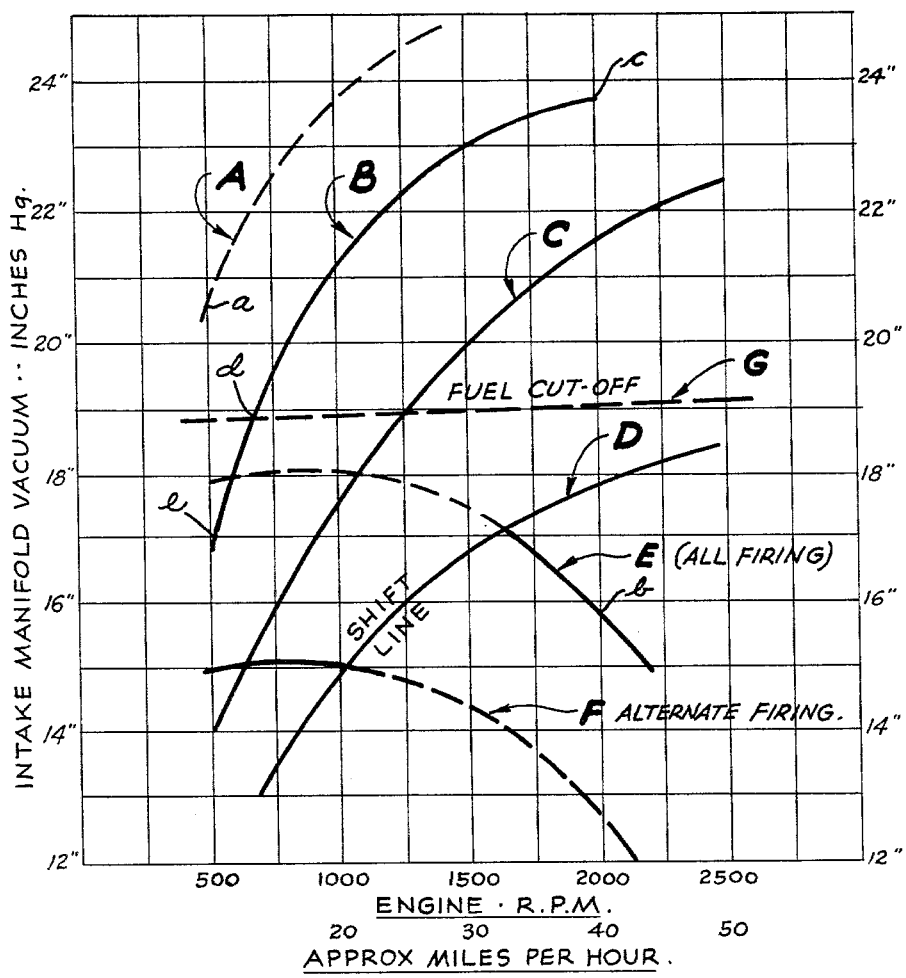
FIG_7

United States Patent Office 3,240,197
Patented Mar. 15, 1966

3,240,197
ENGINE CONTROL
Frank C. Mock, South Bend, Ind., assignor to The Bendix Corporation, South Bend, Ind., a corporation of Delaware
Filed May 31, 1963, Ser. No. 284,467
3 Claims. (Cl. 123—139)

The present invention relates to an improved control for an alternate firing internal combustion engine of the type described in my copending patent application Serial No. 206,839, filed July 2, 1962.

In my referenced copending application I have disclosed fuel control means for reducing smog formation by reducing unburned hydrocarbons in the engine exhaust. This was accomplished by control means operative to cut off fuel during engine decelerations and operative at low speeds to schedule alternate firing and purge cycles.

The present invention is an improvement control including throttle control means for coordinately resetting the throttle plate with the onset of alternate firing, establishing alternate firing as a combined function of throttle position and manifold vacuum, and improved selector valve means.

Other objects and advantages of the present invention will become apparent on consideration of the description and drawings wherein:

FIGURE 1 is a graph showing the relationship between manifold vacuum and hydrocarbon formation;

FIGURE 2 is a detail view partly in section of my improved control system including throttle control and selector valve;

FIGURE 3 is a section view taken along section line 3—3 of FIGURE 1;

FIGURES 4, 5 and 6 show in section three operative positions of the selector valve identified as cut-off, alternate firing, and all firing respectively; and FIGURE 7 is a graph showing operating characteristics of my invention.

It has been found that the uncombined hydrocarbons resulting from incomplete combustion are an important agent in the formation of the toxic gas known as "smog." It is also known that the percentage of such hydrocarbons emitted in the exhaust is greater in the deceleration and idle ranges of engine operation than during acceleration and cruise. This effect is due to low charge pressure and greater exhaust gas dilution of the combustion fuel/air charge resulting in inefficient and incomplete combustion in accordance with the relationship illustrated in the graph of FIGURE 1. In general, the smaller the throttle plate opening and the greater the engine speed, the higher will be the intake manifold vacuum which increases the percentage of exhaust gas dilution and the hydrocarbon units in the exhaust gas. Substantial improvement in reducing the quantities of smog inducing hydrocarbons may thus be made by avoiding operation near the right end of the curve of FIGURE 1, and for example, maintaining engine operation below intake manifold vacuums of 16 to 18 inches of mercury.

Operation at the right end of the curve of FIGURE 1 above 18 inches of manifold vacuum would normally occur in present day engines during the idle and deceleration ranges of operation where the throttle plate is at or near its closed position. In my prior referenced patent application I have described means for cutting off fuel during deceleration and thus eliminating the hydrocarbon formation at this condition; and scheduling "alternate firing" and purge cycles at low throttle plate settings at or near idle which purge the engine cylinder of undesirable gases prior to each firing cycle and further permitted operation at twice the normal air quantity thus requiring a more open position of throttle plate.

Referring to FIGURE 2 I have illustrated improved control apparatus for automatically accomplishing these and other objects which device is operative to cut off fuel during deceleration, schedule "alternate firing" and purge cycles at low throttle settings, permit "all firing" operation during acceleration, cruise conditions of operation, to coordinately reset the throttle plate during "alternate firing" and to initiate the coordinating and "alternate firing" functions automatically in response to throttle position and manifold vacuum.

Proceeding now with the description of my device shown in detail in FIGURES 2 through 6, my invention is applied to a distributing device generally indicated by numeral 10 capable of use with a pre-metered fuel discharge such as may be supplied by an injection carburetor of the type illustrated in my Patent 2,546,901 and represented schematically by the block 12. Metered fuel from device 12 is supplied to my distributing device at inlet port 14 where it enters a centrally arranged fuel distributing chamber 16 within rotatable selector valve member 18. Selector valve 18 contains a pair of transverse distributing ports 20 and 22 formed through the valve sidewall in communication with chamber 16. Selector valve 18 includes a pair of milled slots 24 projecting upwardly from the bottom edge and is adapted to be slidably positioned within the housing of distributor device 10. A drive quill 26 includes projections 28 adapted to be received in the slots 24 of the selector valve and is to be driven at one-quarter engine speed so that for a four part cycle engine, one-half revolution of the drive shaft 26 and selector valve 18 occurs for each engine firing cycle. The distributor device includes a plurality of outlet ports, one for each engine cylinder arranged in the plane of section 3—3 illustrated in FIGURE 3 designated by numerals 31 through 38. Each of these outlet conduits is adapted to be connected to a respective engine cylinder for distributing fuel thereto in timed relation with its firing stroke. The last or rightmost digit of the outlet port numerals 31 through 38 indicates normal firing order sequence and it will be observed that the ports are arranged in an "alternate firing" order sequence progressing clockwise in a circular sweep of FIGURE 3. It will be noted, that port 22 in selector valve 18 has greater height than port 20, however, when the selector valve is positioned in its lowermost position as illustrated in FIGURE 6, both of said ports are in alignment or fall in the plane of outlet ports 31 through 38. This is the "all firing" position of the selector valve in which each cylinder receives its fuel charge in its normal firing order sequence. Referring to FIGURE 3, as selector valve 18 rotates from its position illustrated, port 22 will first connect fuel chamber 16 with outlet port 31. As selector valve 18 sweeps clockwise, port 20 will next connect outlet passage 32 with fuel chamber 16. As the sector valve continues to rotate, ports 22 and 20 are alternately operative to connect the outlet passages 31 through 38 in their normal firing order progression so that after 180° revolution of the selector valve, fuel will have been supplied to the outlet passages in the order 31, 32, 33, 34, 35, 36, 37 and 38.

Referring now to FIGURE 5 it will be noted that as selector valve 18 is raised, port 20 due to its smaller height dimension leaves the plane of outlet passages 31 through 38 and only port 22 is operative to connect central fuel chamber 16 to the outlet ports. This is the "alternate firing" position of the selector valve and referring back to FIGURE 3 it will be noted that when only port 22 is operative the outlet ports will be swept in an "alternate firing" sequence where, for two complete engine firing cycles, the firing order will be 31, 33, 35, 37, 32, 34, 36 and 38.

Still further upward movement of the selector valve 18 causes both ports 20 and 22 to fall outside of the plane of outlet ports 31 through 38 as illustrated in FIGURE 4 wherein all flow to the outlet passage is blocked. This is the "cut-off" position of the selector valve.

The distributing apparatus described to this point is operative to receive the metered fuel and depending on the actual position of selector valve 18 to either supply this fuel in the normal firing order progression, supply the fuel on an alternate firing order sequence, or entirely cut off the fuel depending upon the axial position of the selector valve which has three operative positions.

Referring now to FIGURE 2, there is shown control apparatus for automatically positioning the selector valve for the desired coordination between manifold vacuum and throttle plate position.

Selector valve 18 is positioned axially by rod 40 to which it is connected by ball joint 42. The upper end of rod 40 has a positioning bracket or collar 44 which contains a first abutment flange at 46 and a second abutment flange at 48. Lever 50 is pivoted externally of the distributor device and contains a first foot projection 52 which contacts first flange 46 and a second foot projection 54 in which is threadedly mounted a stop screw 56 which is adjusted to have a spaced clearance with the housing of the distributor device. Selector valve 18 is illustrated in FIGURE 2 in its "all firing" position. For "alternate firing," lever 50 is positioned counterclockwise an amount determined by stop screw 56 which through foot projection 52 moves collar 44, rod 40, and selector valve 18 upwardly to the position illustrated in FIGURE 5.

"Cut-off" position is obtained through the action of diaphragm 60 which is secured at its periphery to the distributor housing to form a sealed chamber at 62 which is connected through conduit 64 to the engine air intake pipe or manifold 66. Diaphragm 60 is normally urged downwardly by a strong spring 68 against abutment flange 70 formed internally of the distributor housing. A bracket 72 is secured centrally of diaphragm 60 and contains a depending flange portion 74 which projects under flange 48 of collar 44. A light spring 76 is interposed between flange portion 74 and rod 40 and insures contactive engagement between flange 46 and foot projection 52. In order to dampen periodic oscillations, the connection between conduit 64 and chamber 62 is made through a relatively large one-way ball check valve 78 and in parallel through a restricted two-way orifice 80.

Referring to the intake manifold 66, a transverse shaft 82 passes through the manifold and contains a throttle plate 84 secured thereto. The connection of conduit 64 with manifold 66 is downstream of the throttle plate in a vacuum region. During engine deceleration the engine operator has permitted throttle plate 84 to assume its most fully closed position as by withdrawing his foot from an accelerator pedal and further the engine normally has appreciable speed so that engine cylinders are pumping a large quantity of air which is sucked through manifold 66. Under these conditions the vacuum in the manifold approaches a maximum which is sufficient to suck diaphragm 60 upwardly whereby flange 74 contacts flange 48 and withdraws the selector valve 18 to its full up or "cut-off" position as illustrated in FIGURE 4. It will be appreciated that by proper selection of the rate and load spring 68 and size of diaphragm 60 cut-off movement may be controlled to occur at a predetermined selected manifold vacuum. As will be later disclosed in connection with the description of operation this is selected to occur at manifold vacuums slightly greater than that ocurring at idle speed so as not to cause engine stall. Briefly summarizing, selector valve 18 is maintained in its "all firing" position when lever 50 is in the position shown in FIGURE 2. It is advanced or shifted to "alternate firing" with counterclockwise movement of lever 50; and finally is positioned in its third operating position "cut off" on actuation of diaphragm 60 in response to a preselected high manifold vacuum.

Automatic control of lever 50 and coordinating adjustments to throttle plate 84 are accomplished by control apparatus disclosed with reference to FIGURE 2.

Freely journalled upon an extension of throttle shaft 82 is a floating cam 90 with an integral arm 92 connected to rod 94 which is connected at its other end to lever 50. Another integral arm 96 is formed on cam 90 and is connected to link 98. Mounted on a pivot shaft 100 secured to intake pipe 66 is an operating lever 102 which at its upper end carries a rocking lever 104 pivoted at 106. The upper end of rocking lever 104 contacts a throttle lever 108 which is secured to shaft 82 for positioning throttle plate 84. The lower end of rocking lever 104 rides on cam 90. Lever 102 has a boss 110 cooperating with adjustable stop 112 and is operated in a direction away from this stop to open throttle plate 84 by rod 114 and accelerator pedal 116 which is pivoted at 118. The arrangement provides that normal adjustment of throttle plate 84 is by means of accelerator pedal 116, but the cam 90 provides an additional vernier adjustment on the throttle plate. Spring 120 urges throttle lever 108 and lever 102 in the direction of stop screw 112.

Link 98 is connected to diaphragm 122 which is secured at its periphery to housing 124 to form one wall of chamber 126. Control spring 128 in chamber 126 urges diaphragm 122 to the left to a fixed position defined by abutment flange 130 formed in vented cover 132. Manifold vacuum is supplied to chamber 126 from intake manifold 66 through conduit 134. Shift control valve 136 is disposed in conduit 134 and is spring loaded to a normally closed position to block the transmission of manifold vacuum to chamber 126.

Operating lever 102 carries an adjustable screw 138 arranged in close proximity to rod 140 projecting from shift control valve 136. At small throttle openings lever 102 is moved counterclockwise so that screw 138 abuts rod 140 and opens shift valve 136 permitting the transmission of manifold vacuum to chamber 126. At low throttle settings and high manifold vacuum the pressure difference across diaphragm 122 is sufficient to overcome the force of spring 128 moving diaphragm 122, link 98, and rotating cam 90 counterclockwise. Counterclockwise movement of cam 90 supplies coordinated control movement to throttle plate 84 through rocker arm 104 and to selector valve 18 through link 94. The action is such that on actuation of diaphragm 122 selector valve 18 is shifted from its "all firing" to its "alternate firing" position and this movement is accompanied by a simultaneous adjustment of throttle plate 84 in an opening direction.

It will be noted that this arrangement tends toward a condition of instability, in that the vacuum transmitted through passage 134 to actuate diaphragm 122 will drop an opening of throttle plate 84 in response to the movement of diaphragm 122. To compensate, or more properly to overcompensate for this, a restricted bleed passage 142 is formed centrally of a rod 144 secured to the right side of diaphragm 122 and communicates with chamber 126 through passage 146 drilled transversely through rod 144. An atmospheric vent passage 148 is formed in sleeve extension 150 which is in turn threadedly secured to housing 124 concentric with rod 144. A second transversely drilled passage 152 is formed in rod 144 normally in alignment with atmospheric vent passage 148. This arrangement provides a limited air bleed to chamber 126 when diaphragm 122 is in its leftmost position against stop flange 130. When the vacuum in chamber 126 is sufficiently high to initiate movement to the right, rod 144 is moved to close off the air bleed through vent 148 causing a step increase in the vacuum in chamber 126 and thereby maintain the diaphragm in its rightmost position irrespective of an offsetting drop in manifold vacuum due to movement of throttle plate 84.

In certain instances it is desirable to supply a correction to fuel delivery simultaneous with the shift to "alternate firing" mode of operation. To accomplish this a collar 154 is pinned to link 98 and engages pivoted lever 156 to supply a correcting signal to fuel metering device 12. The change in fuel delivery required when shifting to "alternate firing" mode is a trim adjustment (usually derichment) or in certain designs, no fuel change may be necessary. Although only half the cylinders are firing per cycle, the air charge per cylinder is roughly doubled. These factors tend to offset one another. By way of example, assuming fuel metering device 12 is of the type illustrated in U.S. Patent 2,546,901, lever 156 may actuate an air bleed valve on manifold pressure capsule 101 (Patent 2,546,901) to provide a desired trim adjustment.

*Operation*

Operation of the present invention is discussed in connection with the graph of FIGURE 7 wherein curves A, B, C and D illustrate a plot of intake manifold vacuum vs. engine r.p.m. at four selected throttle plate positions. Curve A represents the throttle plate in its most closed position as when the engine operator has removed his foot from accelerator pedal 116 and spring 120 urges lever 102 against stop 112. Curves B, C and D represent throttle openings of approximately two, four and eight times, respectively, of the throttle opening of curve A. It will be appreciated that an infinite number of curves actually exist, one for each possible fixed position of the throttle plate 84 within its operative range. For an engine having an idle speed of 500 r.p.m., point *a* on curve A represents an idle manifold vacuum of over 20″ Hg. These curves and the assigned valves are representative of the average large car in use today and indicate that much of the operation occurs above 18″ Hg producing large quantities of smog inducing unburned hydrocarbons as indicated in FIGURE 1.

Actual operation on level road on the other hand during cruise involves variable throttle plate positioning dependent on road speed as distinguished from engine speed and other requirements. Curve E represents vacuum vs. road speed (m.p.h.) for normal "all firing" mode whereas curve F illustrates similar characteristics for "alternate firing" mode of operation. Curve G illustrates the manifold vacuum required to actuate diaphragm 60 and initiate fuel "cut-off" operation.

Referring to FIGURE 2 screw 138 is adjusted to establish the shift point between "all firing" and "alternate firing" mode of operation. This may, for example, be adjusted to coincide with the throttle setting of curve D of FIGURE 7 in which case this curve is identified as the shift line with operation to the right of this curve being the "all firing" mode and operation to the left, "alternate firing."

Assume a car is cruising at 40 m.p.h., it will be operating at point *b* on curve E in a normal "all firing" mode of operation. If the operator now removes his foot from the accelerator pedal to decelerate or stop, spring 120 returns throttle plate 84 to its most closed position which, if the action of cam 90 is momentarily ignored, would be curve A which is in a high vacuum region. However, simultaneously, with release of the accelerator pedal, screw 138 abuts rod 140 opening shift valve 136. This causes the high manifold vacuum to shift diaphragm 122 to the right rotating cam 90, rocker arm 104 and resetting throttle plate 84 in a more open direction to define the curve B as the minimum throttle position curve. Therefore on release of the accelerator pedal, manifold vacuum will shift from that defined by point *b* on curve E to point *c* on curve B. At point *c* manifold vacuum is greatly in excess of that defined by "cut-off" curve G so that diaphragm 60 is actuated upwardly placing selector valve 18 in the position illustrated in FIGURE 4. The engine will continue to decelerate down and to the left of curve B until the point *d* is reached wherein manifold vacuum in chamber 62 has fallen to the point where it is insufficient to overcome the force of spring 68, and diaphragm 60 returns to its stop flange 70. Since diaphragm 122 is still actuated to its extreme right position, lever 50 is located in its extreme counterclockwise position limited by the contact of stop 56 against the distributor housing. Thus selector valve 18 moves downwardly from its "cut-off" position of FIGURE 4 to the "alternate firing" position of FIGURE 5 as defined by contact of flange 46 with foot 52. Deceleration continues from point *d* to the idle point *e* on curve B in "alternate firing" mode. To return to the cruise point *b* the operator depresses the accelerator pedal to accelerate which will initially be on "alternate firing" mode. During acceleration the shift from "alternate firing" to "all firing" will occur as a combined function of the opening of shift valve 136 and a sufficiently high manifold vacuum to overcome spring 128. Since manifold vacuum in turn depends on throttle plate position and engine speed this action insures that the preliminary portion of an acceleration will be an "alternate firing" mode, curve F to the left of shift curve D and after speed has increased and shift to "all firing" mode occurs, operation will be on curve E to the right of shift curve D.

It will be apparent that my control apparatus may be readily adjusted by adjustment of screw 138 and selection of springs 68 and 128 to vary the shift points between the various engine modes of operation to obtain preferred operation for any specific engine installation. In general, the goal in setting control shift points is to avoid or minimize as much as possible the formation of smog inducing unburned hydrocarbons occurring with operation at high manifold vacuums while preserving normal operation in those engine ranges where combustion is efficient and the contamination of exhaust products relatively slight.

Although but one physical arrangement of the control apparatus of the present invention has been shown and described, it is apparent that this apparatus may be modified to take other suitable forms without the exercise of invention and in particular may be readily adapted to control any or all of the various species of controls disclosed in my copending application Serial No. 206,839 to obtain the automatic and coordinated shifting functions described herein.

I claim:

1. A fuel supply control system for an internal combustion engine having one or more engine cylinders and an induction manifold for supplying air to said engine cylinders comprising: a movable throttle plate in said induction manifold for controlling the air supply to said engine cylinders; fuel supply conduits for said engine cylinder for supplying selected fuel charges; fuel supply means; selector means having a cut-off, an alternate firing, and an all firing condition of operation operatively connected to said fuel supply means and said fuel supply conduits to effectively block or permit the passage of fuel in timed relation to cylinder firing stroke; said selector means operative in said cut-off condition to block fuel delivery, operative in said alternate firing condition to permit the passage of fuel for alternate cylinder firing strokes, and operative in said all firing condition of operation to permit the passage of fuel for each successive cylinder firing stroke; control means connected to said throttle plate and said selector means, said control means operative to reset said throttle plate in an opening direction and coordinately shift said selector means from said all firing to said alternate firing condition of operation; and means responsive to manifold vacuum connected to said selector means operative to shift said selector means to said cut-off condition of operation at a predetermined manifold vacuum.

2. A fuel supply control system for an internal combustion engine having one or more engine cylinders and an induction manifold for supplying air to said engine cylinders comprising: a movable throttle plate in said inducton manifold for controlling the air supply to said engine cylinders; fuel supply conduits for said engine cylinders for supplying selected fuel charges; fuel supply means; selector means having an alternate firing and an all firing condition of operation operatively connected to said fuel supply means and said fuel supply conduits to effectively block or permit the passage of fuel in timed relation to cylinder firing stroke; said selector means operative in said alternate firing condition to permit the passage of fuel for alternate cylinder firing strokes, and operative in said all firing condition of operation to permit the passage of fuel for each successive cylinder firing stroke; control means connected to said throttle plate and said selector means, said control means being responsive to manifold vacuum and operative to reset said throttle plate in an opening direction and to coordinately shift said selector means from said all firing to said alternate firing condition of operation in response to a predetermined manifold vacuum.

3. A fuel supply control system for an internal combustion engine having one or more engine cylinders and an induction manifold for supplying air to said engine cylinders comprising: a movable throttle plate in said induction manifold for controlling the air supply to said engine cylinders; a fuel supply conduit for each engine cylinder for supplying a selected cylinder fuel charge; fuel supply means; selector means operative to control delivery of fuel from said fuel supply means to said fuel supply conduits in timed relation to cylinder firing stroke; said selector means having a first position of operation permitting the passage of fuel for each alternate cylinder firing stroke and a second position of operation permitting the passage of fuel for each successive cylinder firing stroke; a pressure responsive member; linkage means connecting said pressure responsive member to said throttle plate and said selector means to shift said selector means from said second to said first position and coordinately moving said throttle plate in an open direction; passage means connected to said induction manifold operative to supply an actuating manifold vacuum to said pressure responsive member; a shift valve disposed in said passage means having a normally closed position operative to block the transmission of an actuating manifold vacuum to said pressure responsive member; an operator actuated throttle lever connected to said shift valve operative to open said shift valve at a predetermined position of said throttle lever.

References Cited by the Examiner

UNITED STATES PATENTS

| | | | |
|---|---|---|---|
| 2,444,440 | 7/1948 | Grieshaber et al. | 123—198 X |
| 2,546,901 | 3/1951 | Mock | 123—119 X |
| 2,875,742 | 3/1959 | Dolza | 123—198 X |

MARK NEWMAN, *Primary Examiner.*

RICHARD B. WILKINSON, *Examiner.*